United States Patent [19]

Hurley et al.

[11] 4,203,570

[45] May 20, 1980

[54] POWER-OPERATED LOADING GATE FOR CENTRIFUGAL MACHINES INCORPORATING AN AUXILIARY DRIVE DEVICE

[75] Inventors: Donald L. Hurley, Hamilton; Francis H. Wessel, North Bend; Joseph B. Bange, Hamilton, all of Ohio

[73] Assignee: The Western States Machine Company, Hamilton, Ohio

[21] Appl. No.: 936,117

[22] Filed: Aug. 23, 1978

[51] Int. Cl.$^2$ ............................................. F16K 31/163
[52] U.S. Cl. ................................... 251/14; 92/117 A; 92/13.3
[58] Field of Search ............... 251/14; 92/13.3, 117 A; 91/217

[56] References Cited

U.S. PATENT DOCUMENTS

| | | | |
|---|---|---|---|
| 2,663,318 | 12/1953 | Lasko | 251/14 |
| 2,710,017 | 6/1955 | Carter | 251/14 X |
| 2,831,464 | 4/1958 | Lillquist | 91/217 X |
| 2,998,220 | 8/1961 | Grieselhuber | 251/31 |
| 3,180,232 | 4/1965 | Ayers, Jr. | 91/217 X |

FOREIGN PATENT DOCUMENTS 696004 10/1964 Canada ........................... 251/14

*Primary Examiner*—Arnold Rosenthal
*Attorney, Agent, or Firm*—Albert C. Johnston; Ronald A. Clayton

[57] ABSTRACT

A loading gate assembly for a heavy cyclical centrifugal machine used for separating liquid from solids includes a hollow body forming a spout outlet, a face surrounding the end of the outlet and a gate slidable on the face between a fully closed position covering the outlet and a position opening the outlet to flow of material therethrough. A gate operating mechanism includes a power drive device secured between a relatively fixed support and a cross head, connected with the gate, for moving the gate between closed and open positions. The loading gate assembly further comprises a mount for the support normally positioning it in a fixed location relative to the outlet yet being operable to displace the support in the direction of closing movement of the gate. A secondary drive device operates the mount to move the gate to the closed position by displacement of the support in the event of failure of power supplied to the power drive device while the gate is open.

12 Claims, 7 Drawing Figures

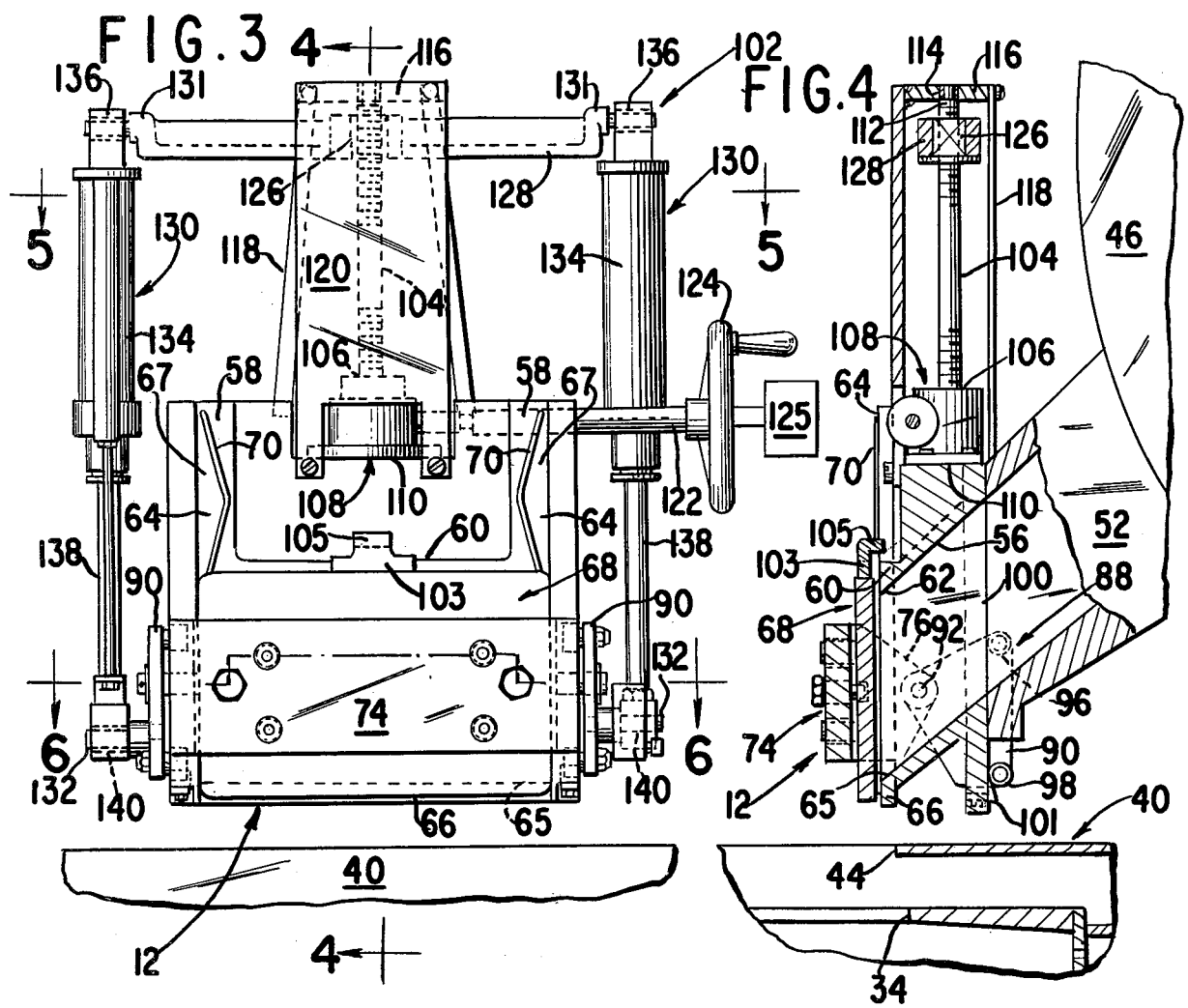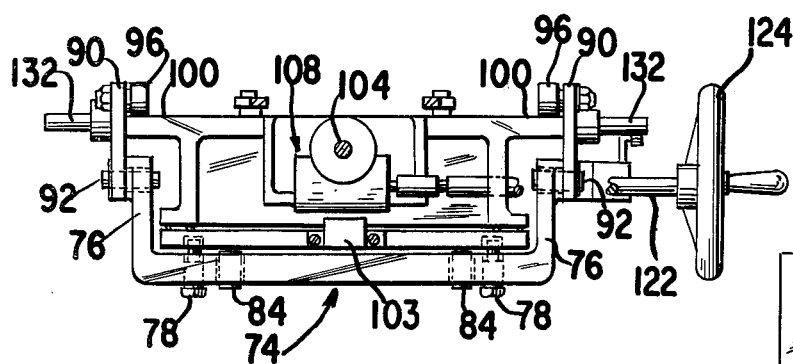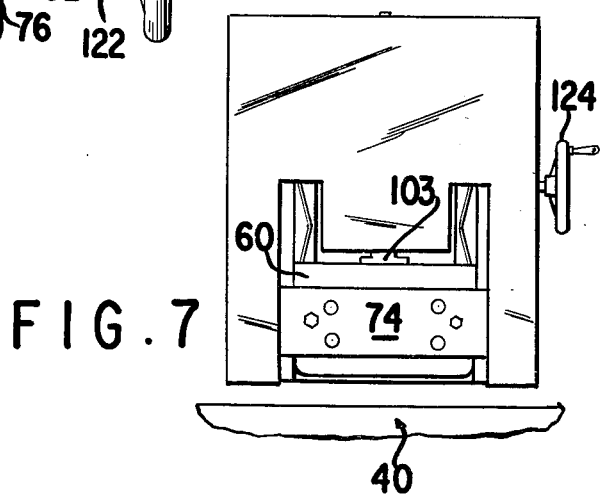

POWER-OPERATED LOADING GATE FOR CENTRIFUGAL MACHINES INCORPORATING AN AUXILIARY DRIVE DEVICE

The present invention relates to a loading gate assembly, and especially to a loading gate operating mechanism, for loading materials from one container to another. This loading gate assembly has particular application for loading charges of material, such as sugar massecuite or magma, into heavy cyclical centrifugal machines that separate liquid from solids in large scale industrial processes.

Centrifugal machines of the type described above generally employ a large rotary basket that receives a charge of material to be centrifuged. For example, in the sugar manufacturing industry, sugar crystals are separated from mixtures of sugar crystals in syrup in the baskets of such machines. In large scale operations, a supply tank or "centrifugal mixer" is positioned adjacent a bank of several centrifugal machines and holds a large quantity of the sugar crystal and syrup mixture. A plurality of loading spouts or chutes extend from the bottom of the supply tank to positions for discharging the mixture into the centrifugal baskets of the respective machines. Each loading spout is equipped with a loading gate for controlling flow of material into the centrifugal machine.

In certain prior art centrifugal machines, the loading gate is operated manually between open and closed positions. However, in order to increase the efficiency of operation of the machines, automatic operation of the loading gate has been proposed. Such loading gate assemblies are disclosed in U.S. Pat. Nos. 2,998,220 (Grieselhuber) and in 2,801,035 (Hertrich). The Hertrich device includes a body formed with a spout outlet and a face surrounding the outlet having a portion extending to one side thereof. The face is formed with narrow bearing strips of hard, wear-resistant metal elevated from its surface and extending around the outlet and along the side portion. A gate is fitted to slide on the bearing strips between a fully closed position covering the outlet and open positions displaced to the side portion. The loading gate is operated by a pair of pressurized fluid actuated, double acting piston and cylinder devices. Further, the loading gate incorporates a track having inclined surfaces which engage to apply a tight clamping force to the gate pressing it against the face of the spout. A handle is provided to move the loading gate in the event of failure of the source of pressurized fluid to piston and cylinder devices.

It is a principal object of the present invention to provide a further and improved loading gate assembly and in particular a loading gate operating mechanism that may be operated to move the loading gate to its closed position in the event of failure of the source of power to power operated devices that ordinarily operate the loading gate.

It is a general object of the present invention to provide a loading gate construction which may be operated by fluid pressure actuated devices or by auxiliary power actuated or manually actuated means, that nevertheless is particularly suitable for automatically controlled loading operations supervised from a remote control center.

It is another object of the invention to provide a loading gate assembly having an auxiliary drive mechanism that may be operated by a power driven device or manually, affording an attendant sufficient mechanical advantage to manually operate the gate despite the high clamping pressures that hold the gate when in its closed position.

It is a further object of the invention to provide a loading gate operating mechanism that permits convenient adjustment of the open position of the loading gate.

The preferred embodiment of the loading gate assembly, described in greater detail below, includes a hollow body forming a spout outlet, a face surrounding the end of the outlet, and a gate mounted to slide on the face between a fully closed position covering the outlet and a position in which it is displaced to open the outlet. A power operated drive device is secured to a relatively fixed support and is connected to a cross head, in turn connected to the gate to drive it between closed and open positions.

The improved gate operating mechanism further comprises means normally positioning the support in a fixed location relative to the outlet yet being operable to displace the support in the direction of closing movement of the gate. A secondary drive is connected to and operates the positioning means to move the gate to its closed position by displacement of the support in the event of failure of the supply of power to the power drive device while the gate is open. In the preferred embodiment, a jackscrew is mounted in a fixed axial position with the hollow body for rotation thereat and extends in the direction of gate movement. A traveling nut is threadedly engaged on the jackscrew and may be moved axially thereon by rotation of the screw. The support, comprising a tie bar, is secured at its center to the traveling nut and extends perpendicularly to the jackscrew to be moved therewith when the jackscrew is rotated. A pair of pressurized fluid actuated, double acting piston and cylinder devices interconnect the tie bar and gate, each being operatively linked between one end of the tie bar and one side of the cross head connected to the gate in order to apply a force thereto to move the gate between its closed and open positions by reaction with the body through the tie bar, traveling nut and jackscrew.

Accordingly, the gate may be actuated automatically by the cylinder and piston devices. However, in the event of failure of the source of pressurized fluid powering the piston and cylinder devices, the gate may be moved to the closed position by rotation of the jackscrew thereby moving the traveling nut, tie bar and piston and cylinder devices. Adjustment of the open position of the gate for operating it in various loading operation modes may also be accomplished by movement of these components.

The foregoing and other objects, features and advantages of the invention will be described in or will be apparent from the following detailed description and the accompanying drawings of the illustrative embodiment. In the drawings:

FIG. 3 is a front elevational view of the loading gate assembly taken through plane 3—3 in FIG. 2 looking rightwardly.

FIG. 4 is a vertical cross-sectional view of the loading gate assembly taken through plane 4—4 in FIG. 3 looking leftwardly.

FIG. 5 is a horizontal cross-sectional view taken through plane 5—5 in FIG. 3 looking downwardly.

FIG. 7 is a reduced scale, front elevational view of the loading gate assembly.

Figure 1:
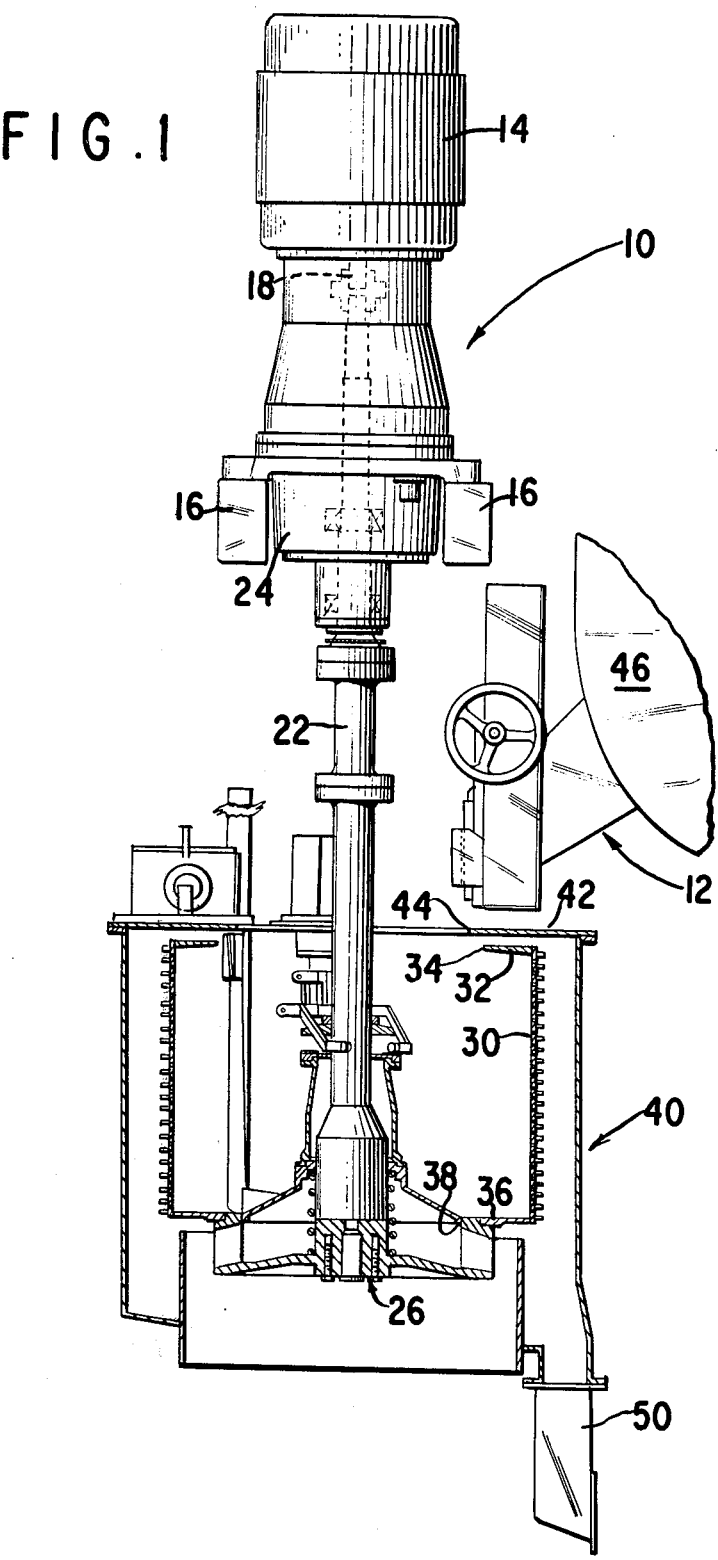
FIG. 1 is a side elevational view, partly in vertical cross-section with some parts broken away to show detail, of a heavy cyclical centrifugal machine mounted in operative relation with a loading gate assembly of the present invention.

FIG. 1 illustrates a heavy cyclical centrifugal machine generally indicated at 10, the loading of which is controlled by the loading gate assembly of the present invention, generally indicated at 12. As can be seen, the centrifugal machine includes a prime mover in the form of a large electric motor 14 that is mounted on a fixed support 16, only part of which is shown in the interest of clarity. The shaft 18 of motor 14 is connected to a spindle 22 that is vertically suspended for gyratory motion in a suitable head 24 mounted in the support 16.

At its bottom end 26, the spindle 22 carries a large centrifugal basket 28 that has a perforated cylindrical side wall 30, which is lined with a screen, a cap 32 open at 34, and a bottom wall 36.

The entire basket is surrounded by a stationary cylindrical curb or casing 40 also mounted in fixed position having a top 42 defining a central opening 44. Flow of material to be centrifuged into the basket 30, through openings 44 and 36 from a holding tank 46, is controlled by the loading gate assembly 12.

The basket 30 is rotated by the electric motor 14 at high centrifuging speed after being charged with material from the tank 46. The centrifuging operation causes liquid to pass through the perforated side wall 30 leaving a cylindrical solid charge thereagainst. The liquid is collected against the inner surface of the cylindrical casing 40 and channeled to a discharge passage 50 and the solid charge is removed from the basket by a discharger mechanism (not shown).

Figure 2:
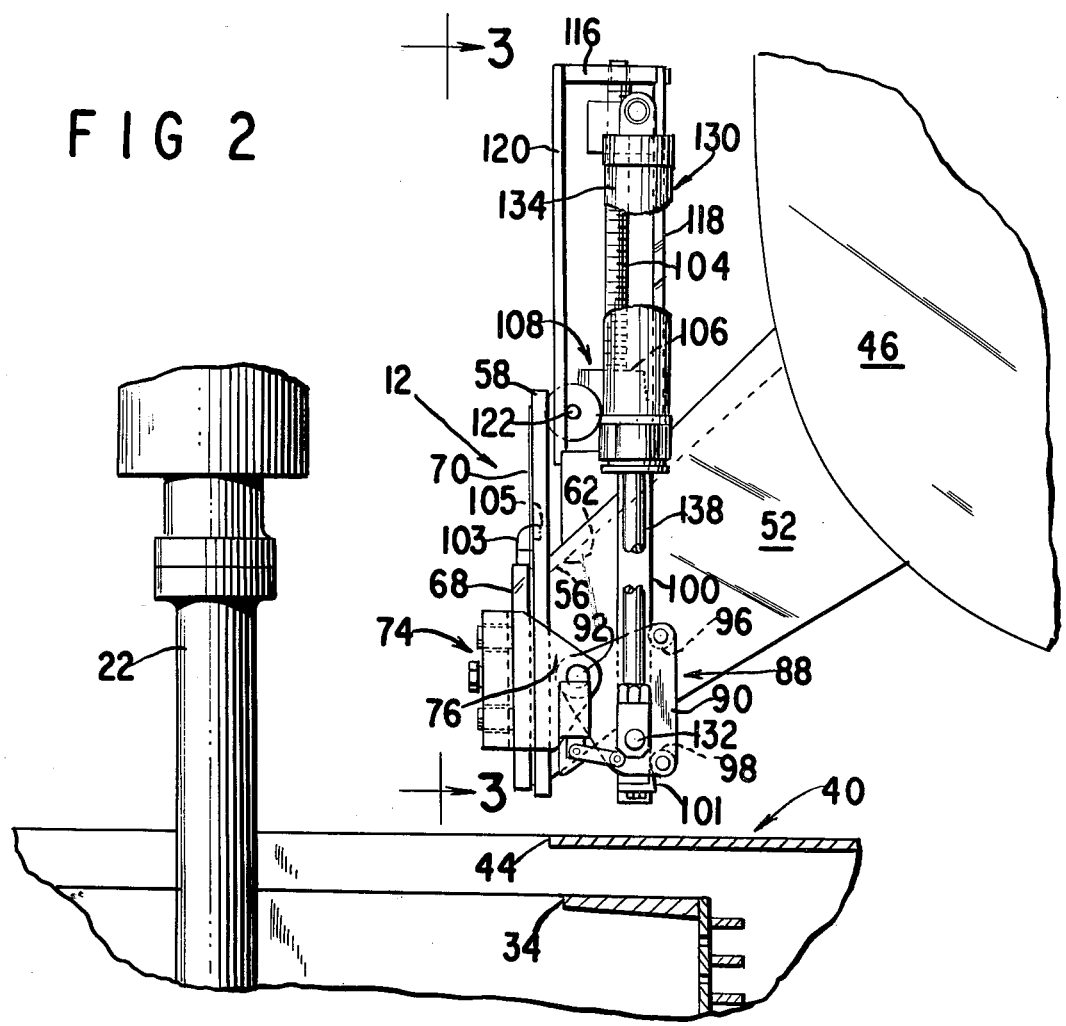
FIG. 2 is an enlarged side elevational view of the loading gate assembly of the invention.

Referring now to FIG. 2, the loading gate assembly 12 of the present invention is associated with a loading spout or chute 52 that extends laterally and downwardly from the lower portion of a mixing tank 46 to a position above the curb 40 and basket of the centrifugal machine. The spout is of generally rectangular cross-sectional shape and has a gate body 56 bolted thereto upon which the loading gate and its operating mechanism are mounted.

As shown in FIG. 3, the forward end wall or facing 58 of the gate body has a generally H-shaped configuration, similar to that disclosed in U.S. Pat. No. 2,801,035 (Hertrich), in that an intermediate cross member 60 overlies the upper margin of a spout outlet 62 and is joined at its ends to two vertically arranged legs 64, the lower portions 65 of which are connected by a lower cross member 66. The upper portions 67 of the legs 64 project above the cross member 60 and provide a slide way for a gate 68 moving from a closed position covering the outlet 62 to an open position displaced to these upper leg portions.

The forward surface of the facing 58 has narrow bearing strips 70 as described in the Hertrich patent that ensure tight fitting of the gate to the facing 58 and that strip accumulated deposits of the crystal and syrup mixture by a wiping action between them and the gate when it is moved thereover.

Sliding movement of the gate 68 between its fully closed and open positions is effected by a gate operating mechanism in accordance with the present invention that includes a cross head 74 which extends transversely across the outer front face of the gate 68 and has rearwardly directed end portions 76 that loosely embrace the outer side margins of the gate body 56.

Figure 6:
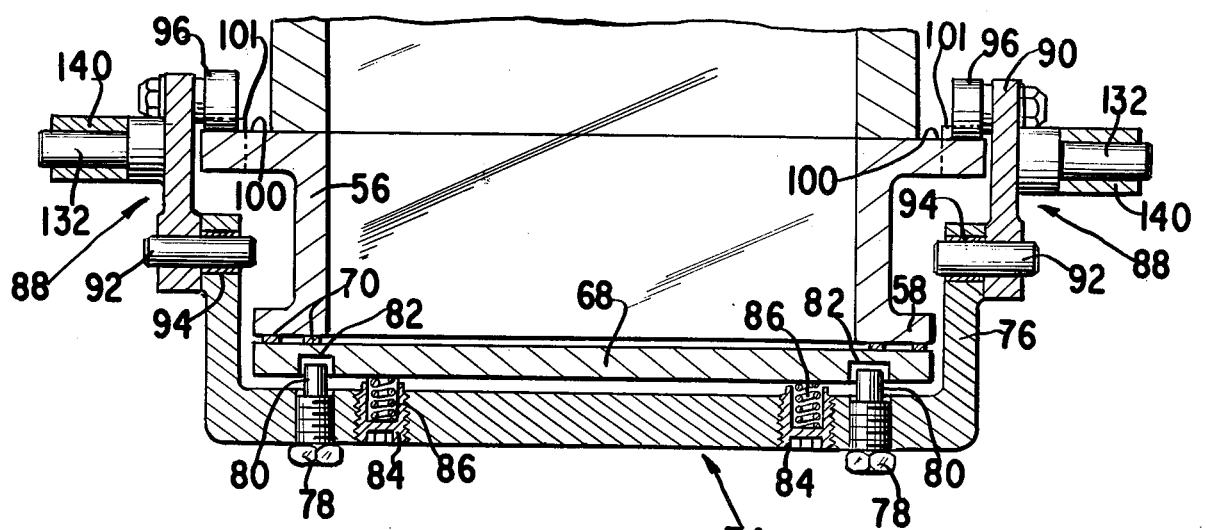
FIG. 6 is a horizontal cross-sectional view enlarged to show detail of the loading gate assembly taken through discontinuous plane 6—6 in FIG. 3 looking downwardly.

As can be seen in FIG. 6, in order to cause the gate to move with the cross head when operated in a manner described in greater detail below, bolts are threaded through the cross head and have unthreaded end portions 80 that are loosely received in diametrically enlarged recesses 82 formed in the front face of the gate. Thus, the cross head is free to move vertically through a limited distance independently of the gate 68 before the portions 80 of bolts 78 impact the sidewalls of corresponding recesses 82. Such impact is helpful in achieving initial movement of the gate toward or away from its closed position.

In order to adjust the pressure of the gate against the bearing strips 70, four pressure exerting wedge screws 84 are threaded through cross head 74 and house compression springs 86 that bear against the front face of gate 68. As can be seen in FIG. 6, each wedge screw has a tubular section that houses a spring 86, the compression force exerted by each being adjustable by turning the wedge screw toward or away from the gate face.

The cross head is held in operative position against the front face of the gate by pull plate assemblies 88 shown in detail in FIGS. 4 and 6. Each assembly comprises a pull plate 90 that is mounted for pivoted movement on a pin 92 on one of the rearwardly directed portions 76 of the cross head 74. A bearing 94 links the pin 92 to the rearwardly directed portion 76 to facilitate free pivoted movement. At its rearmost edge, each pull plate 90 carries upper and lower follower rollers 96 and 98 for rotation to track on a vertically extending rail 100 formed as a sidewardly and vertically extending portion of the gate body 56 at its rear (FIG. 5), the vertical extensions of the rails being parallel to the facing 58 of the gate body and extending in the direction of gate movement between closed and open positions. A wedge 101 is positioned at the lower end of each rail 100 and is engaged by the lower follower roller 98 on its associated pull plate to exert a rearwardly directed clamping force on the cross head and gate when moved to the closed position. The wedges on both rails also act as stops to limit downward movement of the gate to its fully closed position. In addition, an inverted J-shaped gate stop 103 is secured to the top edge of the gate 68 and has a leg 105 that abuts the top surface of cross member 60 to positively prevent the spout outlet 62 from being opened adjacent the cross member 60.

Vertical movement of the pull plates 90 and, hence, the cross head 74 and gate 68 is achieved by a gate operating mechanism, generally indicated at 102 and shown in detail in FIGS. 2 through 5. This operating mechanism comprises a jackscrew 104 that is mounted with its axis extending vertically in the direction of gate movement. The lower end 106 of the jackscrew is operatively connected to and supported in a worm drive gear 108 mounted on a horizontal platform 110 formed on the gate body 56 above the cross member 60. At its upper end 112, the jackscrew 104 is supported for rotation in a bearing 114 mounted in a horizontal support bracket 116 held in its elevated position by two generally vertically extending guide rails 118 secured to the back of the gate body 56 and a vertically extending standard 120 secured to the front of platform 110.

The worm drive 108 is also operatively connected to a sidewardly extending drive shaft 122 that carries a hand wheel 124 at its free end. Rotation of the hand wheel actuates the worm drive gear to rotate the jackscrew 104. An auxiliary or secondary power drive 125, such as an electric motor shown diagrammatically in FIG. 3, may also be operatively connected to the shaft 122 to operate the worm drive gear.

The jackscrew 104 threadedly receives a traveling nut 126 that may be moved axially upwardly and downwardly by rotation of the jackscrew, that is in the direction of movement of the gate. A support comprising a tie bar 128 is carried on the traveling nut and can be moved vertically therewith and extends generally perpendicularly to either side of the jackscrew as shown in FIG. 3. The tie bar slidably engages the guide rails 118 to prevent rotation of it when the jackscrew is rotated.

A pair of power drive devices, specifically pressurized fluid actuated piston and cylinder devices 130, interconnect the outer ends 131 of the tie bar and sidewardly directed stub shafts 132 welded in cantilever relation to the outer surfaces of the pull plates 90. The cylinder 134 of each assembly 130 is linked for pivoted movement through a bearing 136 to the outer ends 131 of the tie bar and a piston 138 vertically received for reciprocal movement in each cylinder is linked through a bearing 140 to each stub shaft 132.

Each piston and cylinder device 130 is double acting and may be actuated by a source of pressurized fluid such as compressed air (not shown). Accordingly, application of pressurized air to one side of the piston in the cylinder forces the pull plates, cross head and, hence, the gate downwardly to its fully closed position. Application of pressurized fluid to the opposite side of the piston moves the respective parts upwardly to move the loading gate to an open position. It will be appreciated that gate movement in either the closing or opening direction is accomplished by reaction through the tie bar, traveling nut and jackscrew with the gate body. Thus, these piston and cylinder devices 130 provide power actuation for automatic operation of the loading gate during automatic operation of the centrifugal machine.

However, it will be further appreciated that in the event of failure of the source of pressurized fluid powering the piston and cylinder devices, the loading gate may be moved to its closed position by rotation of the hand wheel either manually or with the auxiliary power drive 125 in turn rotating the jackscrew. This rotation will move the traveling nut, tie bar and cylinders downwardly as a unit to fully compress each piston in its respective cylinder. Once such lost motion of the pistons in the cylinders has been fully taken up, the gate may further be moved to its closed position in the emergency. The mechanical advantage provided by the worm drive gear operated jackscrew is sufficient to permit the loading gate to be moved to its closed position with relatively low effort by the operator. Accordingly, it will be appreciated that the apparatus of the invention provides a substantial improvement by increased safety of machine operation.

It may be desirable to operate the loading gate in various operating modes. For example, depending upon the viscosity of the mix being loaded into the centrifugal machine, it may be desirable to adjust the loading gate so as not to open the outlet spout completely. The jackscrew arrangement provides for such adjustment by permitting positioning of the pistons when in their positions fully telescoped into their respective cylinders by positioning the tie bar and traveling nut as a unit to position the gate in the desired open position. The piston should have a travel sufficiently long to fully close the gate from a fully open position or any intermediate open position in order to provide this adjustability.

Therefore, the jackscrew arrangement of the present invention provides a further advantage in providing easy adjustability of the open position of the loading gate.

Accordingly, although a specific embodiment of the present invention has been described above in detail, it is to be understood that this is for purposes of illustration. Modifications may be made to the described loading gate actuating mechanism in order to adapt it to particular applications other than use for using heavy cylindrical machines.

We claim:

1. In a loading gate assembly for delivering massecuite or like material, including a hollow gate body forming a spout outlet, a gate supporting face on said body, a gate slidable on said face between a closed position covering the outlet and a position opening the outlet for flow of material therethrough, and gate operating means including power operated drive means secured to a relatively fixed support and means drivable by said drive means and connected with said gate for moving the gate between closed and open positions, the improvement which comprises means normally positioning said support in a fixed location relative to said outlet yet being operable to displace said support in the direction of closing movement of said gate, and secondary drive means connected with and for operating said positioning means to move said gate to closed position by displacement of said support in the even of failure of the power supply to said power operated drive means while the gate is open, said secondary drive means including both a power operable motor and a hand operable means connected with and for operating said positioning means so that the gate is movable to closed position by manual operation in the absence of power supply to said motor.

2. A loading gate assembly according to claim 1, said gate operating means comprising at opposite sides of said outlet fluid pressure operated piston and cylinder assemblies each having a cylinder and a piston drivable therein, said support comprising a bar extending across said gate body with said assemblies secured to opposite end positions of said bar and a screw-threaded nut fixed to a mid portion thereof, said positioning means comprising a jackscrew extending vertically through and threaded in said nut and rotatable therein to displace said bar and said assemblies as a unit in said direction.

3. A loading gate assembly according to claim 2, said screw having a worm gear fixed thereto and engaged with a worm that is rotatable by said secondary drive means for rotating said screw.

4. In a loading gate assembly for delivering massecuite or like material, including a hollow gate body forming a spout outlet, a gate supporting face on said body, a gate slidable on said face between a closed position covering the outlet and a position opening the outlet for flow of material therethrough, and gate operating means including power operated drive means, comprising at opposite sides of said outlet fluid pressure operated piston and cylinder assemblies each have a cylinder and a piston drivable therein, said drive means being secured to a relatively fixed support, and means drivable by said drive means and connected with said gate for moving the gate between closed and open positions, the improvement in which said support comprises a bar extending across said gate body with said piston and cylinder assemblies secured to opposite end positions of said bar, and a screw-threaded nut fixed to a mid portion thereof, and wherein the improvement further comprises means normally positioning said support in a fixed location relative to said outlet yet being operable to displace said support in the direction of closing movement of said gate, said positioning means comprising a jackscrew extending vertically through and threaded in said nut and rotatable therein to displace said bar and said piston and cylinder assemblies as a unit in said direction, and secondary drive means connected with and for operating said positioning means to move said gate to closed position by displacement of said support in the event of failure of the power supply to said power operated drive means while the gate is open.

5. A loading gate assembly according to claim 4, said screw having a worm gear fixed thereto and engaged with a worm that is rotatable by said secondary drive means for rotating said screw.

6. A loading gate assembly according to claim 4 or claim 6, said secondary drive means including both a power operable motor and a hand operable means connected with and for operating said positioning means so that the gate is movable to closed position by manual operation in the absence of power supply to said motor.

7. In a loading gate assembly for delivering massecuite or like material, including a hollow gate body forming a spout outlet, a gate supporting face on said body, a gate slidable on said face between a closed position covering the outlet and a position opening the outlet for flow of material therethrough, and gate operating means including power operated drive means, comprising at opposite side of said outlet fluid pressure operated piston and cylinder assemblies each having a piston and a cylinder drivable therein, said drive means being secured to a relatively fixed support, and means drivable by said drive means and connected with said gate for moving the gate between closed and open positions, the improvement in which said support comprises a bar extending across said gate body with said piston and cylinder assemblies secured to opposite end positions of said bar, and a screw-threaded nut fixed to a mid portion thereof, and wherein the improvement further comprises;

means normally positioning said support in a fixed location relative to said outlet yet being operable to displace said support in the direction of closing movement of said gate, said positioning means comprising a jackscrew extending vertically through and threaded in said nut and rotatable therein to displace said bar and said piston and cylinder assemblies as a unit in said direction, a worm gear fixed to said screw, and a worm engaged with said worm gear; and secondary drive means for rotating said worm to in turn rotate said screw thereby operating said positioning means to move said gate to said closed position by displacement of said support in the event of failure of the power supply to said power operated drive means while said gate is open.

8. A loading gate according to claim 7, said secondary drive means including both a power operable motor and a hand operable means connected with said positioning means so that the gate is movable to closed position by manual operation in the absence of power supply to said motor.

9. In a loading gate assembly for delivering massecuite or like material, including a hollow gate body forming a spout outlet, a gate supporting face on said body, a gate slidable on said face between a closed position covering the outlet and a position opening the outlet for flow of material therethrough, and gate operating means including power operated drive means, comprising at opposite sides of said outlet fluid pressure operated piston and cylinder assemblies each having a cylinder and a piston drivable therein, said drive means being secured to a relatively fixed support and means drivable by said drive means and connected with said gate for moving the gate between closed and open positions, the improvement in which said support comprises a bar extending across said gate body with said piston and cylinder assemblies secured to opposite end positions of said bar, and wherein the improvement further comprises means normally positioning said support in a fixed position relative to said outlet yet being operable to displace said support in the direction of closing movement of said gate, said positioning means comprising first means providing a mechanical advantage for displacing said bar and said piston and cylinder assemblies as a unit in said direction, and second means providing a second mechanical advantage for operating said first providing means, and secondary drive means for operating said second providing means thereby operating said first providing means to move said gate to said closed position by displacement of said support in the event of failure of the power supply to said power supply to said power operated drive means while said gate is open.

10. A loading gate assembly according to claim 9, said first mechanical advantage providing means comprising a screw-threaded nut fixed to a mid portion of said bar and a jackscrew extending vertically through and threaded in said nut and rotatable therein to displace said bar and said piston and cylinder assemblies as a unit in said direction.

11. A loading gate according to claim 10, said second mechanical advantage providing means comprising a worm gear fixed with said screw and a worm engaged with said worm gear.

12. A loading gate according to claim 9, 10, or 11, said secondary drive means including both a power operable motor and a hand operable means connected with said positioning means so that the gate is movable to closed position by manual operation in the absence of power supply to said motor.

* * * * *

UNITED STATES PATENT AND TRADEMARK OFFICE
CERTIFICATE OF CORRECTION

PATENT NO. : 4,203,570

DATED : May 20, 1980

INVENTOR(S) : Donald L. Hurley, et al.

It is certified that error appears in the above-identified patent and that said Letters Patent are hereby corrected as shown below:

Claim 1, column 6, line 38 "even" should be -- event --.

Claim 6, column 7, line 31 "claim 6," should be -- claim 5, --.

Claim 7, column 7, line 43 "comprising at opposite side of said" should be -- comprising at opposite sides of said --.

Claim 7, column 7, line 45 "piston and a cylinder drivable therein" should be -- cylinder and a piston drivable therein --.

Signed and Sealed this

Thirteenth Day of January 1981

[SEAL]

Attest:

SIDNEY A. DIAMOND

Attesting Officer

Commissioner of Patents and Trademarks